(12) United States Patent
Iwasaki et al.

(10) Patent No.: US 12,516,217 B2
(45) Date of Patent: Jan. 6, 2026

(54) PRIMER COMPOSITION AND CURTAIN WALL UNIT

(71) Applicants: SHIN-ETSU CHEMICAL CO., LTD., Tokyo (JP); SHIN-ETSU SILICONE KOREA CO., LTD., Seoul (KR)

(72) Inventors: Isao Iwasaki, Annaka (JP); Takafumi Sakamoto, Annaka (JP); Jaryong Park, Eumseong-gun (KR); Sungwoo Kim, Eumseong-gun (KR)

(73) Assignees: SHIN-ETSU CHEMICAL CO., LTD., Tokyo (JP); SHIN-ETSU SILICONE KOREA CO., LTD., Seoul (KR)

( * ) Notice: Subject to any disclaimer, the term of this patent is extended or adjusted under 35 U.S.C. 154(b) by 0 days.

(21) Appl. No.: 18/115,362

(22) Filed: Feb. 28, 2023

(65) Prior Publication Data

US 2023/0203340 A1   Jun. 29, 2023

Related U.S. Application Data

(62) Division of application No. 16/325,535, filed as application No. PCT/JP2017/025888 on Jul. 18, 2017, now abandoned.

(30) Foreign Application Priority Data

Sep. 9, 2016  (JP) .................. 2016-176598

(51) Int. Cl.
| | |
|---|---|
| C09D 183/04 | (2006.01) |
| B32B 15/06 | (2006.01) |
| B32B 25/20 | (2006.01) |
| C09D 5/00 | (2006.01) |
| C09D 7/63 | (2018.01) |
| C08K 5/00 | (2006.01) |
| E04B 2/88 | (2006.01) |

(52) U.S. Cl.
CPC ............ *C09D 183/04* (2013.01); *B32B 15/06* (2013.01); *B32B 25/20* (2013.01); *C09D 5/002* (2013.01); *C09D 7/63* (2018.01); *B32B 2255/06* (2013.01); *B32B 2255/26* (2013.01); *B32B 2255/28* (2013.01); *B32B 2419/00* (2013.01); *C08K 5/0091* (2013.01); *E04B 2/88* (2013.01)

(58) Field of Classification Search
CPC .............. C08K 5/56; E04B 2/88; E04B 2/885
See application file for complete search history.

(56) References Cited

U.S. PATENT DOCUMENTS

| | | | |
|---|---|---|---|
| 4,059,473 A | 11/1977 | Okami | |
| 4,546,018 A * | 10/1985 | Ryuzo ................. | C08G 59/306 427/322 |
| 4,924,016 A | 5/1990 | Barfurth et al. | |
| 5,081,181 A * | 1/1992 | Takahashi ............... | C08J 5/124 528/901 |
| 5,085,894 A * | 2/1992 | Pascucci ................. | C08J 5/124 427/407.1 |
| 5,326,844 A * | 7/1994 | Fujiki ........................ | C09J 5/02 556/439 |
| 6,132,664 A | 10/2000 | Freiberg et al. | |
| 2008/0284106 A1 * | 11/2008 | Maton ...................... | C08K 5/01 524/588 |
| 2012/0108730 A1 | 5/2012 | Zander et al. | |
| 2015/0275045 A1 | 10/2015 | Adachi et al. | |

FOREIGN PATENT DOCUMENTS

| | | |
|---|---|---|
| JP | 53-5043 B2 | 2/1978 |
| JP | 4-224879 A | 8/1992 |
| JP | H0671784 B2 * | 9/1994 |
| JP | 2522856 B2 | 8/1996 |
| JP | 8-295852 A | 11/1996 |
| JP | 2914854 B2 | 7/1999 |

(Continued)

OTHER PUBLICATIONS

English machine translation of JP0601784B (1994).*
Yamamoto, Structures of the Reaction Products of Tetraalkoxytitanium with Acetylacetone and Ethyl Acetoacetate, 1957, Journal of the American Chemical Society, 79 (16), pp. 4344-4348. (Year: 1957).*
Yamada, Formation Behavior and Optical Properties of Transparent Inorganic-Organic Hybrids Prepared from Metal Alkoxides and Polydimethylsiloxane, 2000, Journal of Sol-Gel Science and Technology, 17, pp. 123-130. (Year: 2000).*
Environmental Protection Agency, Complete List of VOC Exemption Rules, retrieved from <https://www.epa.gov/ground-level-ozone-pollution/complete-list-voc-exemption-rules> on Dec. 23, 2024. (Year: 2024).*
Wikipedia.org, "VOC exempt solvent", retrieved from <https://en.wikipedia.org/w/index.php?title=VOC_exempt_solvent&oldid=1249979353> on Dec. 23, 2024. (Year: 2024).*

(Continued)

*Primary Examiner* — Monique R Jackson
(74) *Attorney, Agent, or Firm* — Birch, Stewart, Kolasch & Birch, LLP

(57) ABSTRACT

Provided are a primer composition that can adhere well to a variety of adherends and ensures a long workable time together with excellent durability, and a curtain wall unit. A primer composition comprising: (A) 100 parts by mass of an organosiloxane polymer having a three-dimensional network structure comprising $R_3SiO_{1/2}$ units (R independently represents a C1-6 substituted or unsubstituted monovalent hydrocarbon group) and $SiO_{4/2}$ units, the molar ratio of $R_3SiO_{1/2}$ units to $SiO_{4/2}$ units being 0.6-1.2; (B) 300-1,000 parts by mass of a mixture of organo-oxy-group-containing titanium compounds containing 75 mol % or more of an organo-oxy-group-containing titanium compound represented by formula (1)

$$Ti(OR^1)_3(R^2CH_2COCHCOOCH_2R^2)_1 \quad (1)$$

($R^1$ may be the same or different and are substituted or unsubstituted monovalent hydrocarbon groups, $R^2$ may be the same or different and are hydrogen atoms and/or substituted or unsubstituted monovalent hydrocarbon groups); and (C) 1,000-8,000 parts by mass of a solvent.

8 Claims, No Drawings

(56) References Cited

FOREIGN PATENT DOCUMENTS

| JP | 11-256139 A | | 9/1999 |
|----|----|----|----|
| JP | 2991934 B2 | | 12/1999 |
| JP | 2002-241500 A | | 8/2002 |
| JP | 2014114434 A | * | 6/2014 |
| JP | 2015-537073 A | | 12/2015 |
| WO | WO 2015/186515 A1 | | 12/2015 |

OTHER PUBLICATIONS

Picard, Bonding of silicone rubbers on metal: (1): Chemistry of adhesion, 2015, Progress in Organic Coatings, 87, pp. 250-257. (Year: 2015).*

Picard, Bonding of silicone rubbers on metal (2) physical chemistry of adhesion, 2015, Progress in Organic Coatings, 87, pp. 258-266. (Year: 2015).*

Picard, Chemical adhesion of silicone elastomers on primed metal surfaces: A comprehensive survey of open and patent literatures, 2015, Progress in Organic Coatings 80, pp. 120-141. (Year: 2015).*

Machine translation of JP2014114434A, Description, published Jun. 2014, Powered by EPO and Google. (Year: 2014).*

Dagobert Hoebbel. 1997, On the Hydrolytic Stability of Organic Ligands in Al-, Ti- and Zr-Alkoxide Complexes, Journal of Sol-Gel Science and Technology, vol. 10, pp. 115-126.

English translation of the International Preliminary Report on Patentability and Written Opinion of the International Searching Authority for International Application No. PCT/JP2017/025888, dated Mar. 12, 2019.

International Search Report (PCT/ISA/210) issued in PCT/JP2017/025888, dated Aug. 15, 2017.

Jung Structural Investigation of the Hydrolysis-Condensation Process of Modified Titanium Isopropoxide, Bull. Korean Chem. Soc. vol. 20, No. 12, pp. 1394-1398.

Written Opinion of the International Searching Authority (PCT/ISA/237) issued in PCT/JP2017/025888, dated Aug. 15, 2017.

* cited by examiner

PRIMER COMPOSITION AND CURTAIN WALL UNIT

CROSS-REFERENCE TO RELATED APPLICATIONS

This application is a Divisional of U.S. application Ser. No. 16/325,535, filed on Feb. 14, 2019, which was a national stage of PCT International Application No. PCT/JP2017/025888 filed on Jul. 18, 2017, which claims the benefit under 35 U.S.C. § 119(a) to Japanese Patent Application No. 2016-176598, filed in Japan on Sep. 9, 2016, all of which are hereby expressly incorporated by reference into the present application.

TECHNICAL FIELD

This invention relates to a primer composition which is useful for bonding a room temperature-curable organopolysiloxane composition to various adherends and a curtain wall unit. More particularly, it relates to a primer composition having improved adhesion to difficultly bondable adherends such as acrylic electrodeposits, improved adhesion durability at high temperature, and a sufficient working life for coating operation, and a curtain wall unit using the primer composition.

BACKGROUND ART

In bonding room temperature (RT) curable organopolysiloxane compositions used as building sealants, general industrial sealants, and adhesives to a variety of adherends, use is made of "silane base primers" composed mainly of a silane or silane coupling agent, titanate and solvent, "silicone resin base primers" composed mainly of an organopolysiloxane resin, titanate, silane coupling agent, and solvent, "urethane base primers" composed mainly of a polyisocyanate compound and solvent, and "acrylic primers" composed mainly of a silane-modified acrylic resin and solvent (see Patent Documents 1 to 6).

As the silane coupling agent in the silane base primers, compounds having an amino, epoxy, mercapto or isocyanate group are generally used. As the polyisocyanate compound in the urethane base primers, the reaction products obtained from addition reaction of an isocyanate compound with a polyol such as polyethylene glycol or polypropylene glycol or hydroxyl-containing acrylic oligomer are known.

The silane base primers are useful to inorganic adherends such as metals and glass, and have good heat resistance, weather resistance and durability. However, it is frequently found that the silane base primers are not fully adherent to organic adherends, typically various resins. Particularly, the silane base primers are less adherent to acrylic electrophoretic painted aluminum (in which acrylic resin-based paint is electrophoretically painted to aluminum), and fluororesin-painted aluminum (in which fluororesin-based paint is painted to aluminum), which are frequently used in aluminum sashes or window frames in the recent years.

On the other hand, the urethane base primers provide a fairly satisfactory level of adhesion to a variety of adherends including metal and organic adherends, but are short of durability in terms of heat resistance, weather resistance and water resistance due to the characteristics of urethane resins. The urethane base primers are thus inadequate in the application of curable silicone compositions where long-term durability is generally required. Also, even when a blend of silane and polyisocyanate base primers is used, it is difficult to meet both adhesion and durability.

The acrylic primers are composed mainly of an acrylic resin having an alkoxysilyl group and a solvent. As the acrylic primers, many products exhibiting good adhesion to acrylic, polystyrene and other resins to which a RT-curable organopolysiloxane composition is difficultly bondable without a primer, are commercially marketed. Of these, some products are adherent to the acrylic electrophoretic painted aluminum and fluororesin-painted aluminum and have high heat resistance, weather resistance and water resistance. The heat resistance and weather resistance of acrylic primers are high among general organic resins, but not comparable to those of silicone base primers. On use of an acrylic primer, the bond durability of the RT-curable organopolysiloxane composition, which is affected by the durability of a resin layer of the acrylic primer, is not satisfactory as compared with silane and silicone resin base primers.

In contrast, while the silicone resin base primers contain an organopolysiloxane resin as one active ingredient, and a titanate, aminosilane coupling agent and silane compound as bonding ingredients, they are known to meet both adhesion to glass adherends, metal adherends, and organic adherends (various resins), and adhesion to the acrylic electrophoretic painted aluminum and fluororesin-painted aluminum.

For this reason, the silicone resin base primers are advantageously used as the primer in applications covering various adherends including mainly glass, metals, resins, and resin-painted surfaces.

PRIOR ART DOCUMENTS

Patent Documents

Patent Document 1: JP-B S53-005043
Patent Document 2: JP 2522856
Patent Document 3: JP-A H04-224879
Patent Document 4: JP-A H08-295852
Patent Document 5: JP 2914854
Patent Document 6: JP 2991934

SUMMARY OF INVENTION

Technical Problem

However, since the organopolysiloxane resin left as a film-former component after drying of the silicone resin base primer has poor adhesion to various adherends, a high activity metal alkoxide such as a titanate (titanic acid ester) must be used in order that the primer film develop good adhesion to the adherend. The high activity titanate has a high adhesion imparting ability, but is readily hydrolyzable. Therefore, when the primer composition is used in a humid environment, the titanate can react with moisture in the gas phase during coating operation, often giving rise to problems of outer appearance and working, for example, forming a precipitate in a short time, turning cloudy or solidifying to interfere with coating. There also arises a serious problem that the bonding performance of the primer can be degraded even prior to any change of outer appearance. For preventing the occurrence of such problems, the manufacturer of the primer recommends to the user that when the sealed container is opened and a fraction of the primer is dispensed into another open container prior to coating operation, the primer should be coated within 10 minutes from dispensing. In actual work, a work time of about 10 minutes to about 30 minutes is often necessary. It would be desirable to have a primer composition which is fully adherent to fluororesin painted, acrylic electrophoretic painted or otherwise painted adherends which are difficultly bondable, has improved heat resistance, durability (e.g., UV resistance) and weather resistance, undergoes no change in outer appearance upon long-term exposure to a humid environment during application, and develops good adhesion to a variety of adherends.

Therefore, an object of the invention is to provide a primer composition which develops good adhesion to a variety of adherends, has improved durability in various items, and has a long working life; and a curtain wall unit using the primer composition.

Solution to Problem

Making extensive investigations on the relevant primer composition, the inventors have found that the problem is solved by mixing an organopolysiloxane resin of specific structure with a titanium compound of specific structure and a solvent in a predetermined ratio to formulate a primer composition. The invention is predicated on this finding.

The invention provides a primer composition and a curtain wall unit in which a silicone rubber layer is bonded to a metal and/or painted metal surface through a coating layer of the primer composition.

[1]

A primer composition effective for improving the adhesion between a substrate selected from organic resins, metals and resin-painted metals and a cured product of a room temperature curable organopolysiloxane composition, the primer composition comprising:

(A) 100 parts by weight of an organosiloxane polymer of three-dimensional network structure comprising $R_3SiO_{1/2}$ units and $SiO_{4/2}$ units, a molar ratio of $R_3SiO_{1/2}$ units to $SiO_{4/2}$ units being 0.6 to 1.2, wherein R is each independently a substituted or unsubstituted monovalent hydrocarbon group of 1 to 6 carbon atoms, (B) 300 to 1,000 parts by weight of a titanium compound having the formula (1) or a mixture of organooxy-containing titanium compounds containing at least 75 mol % of a titanium compound having the formula (1):

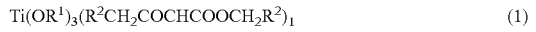

$$Ti(OR^1)_3(R^2CH_2COCHCOOCH_2R^2)_1 \quad (1)$$

wherein $R^1$ which may be the same or different is a substituted or unsubstituted monovalent hydrocarbon group, and $R^2$ which may be the same or different is hydrogen and/or a substituted or unsubstituted monovalent hydrocarbon group, and (C) 1,000 to 8,000 parts by weight of a solvent.

[2]

The primer composition of [1] wherein component (B) is a mixture of reaction products which are formed by mixing (B1) a tetraorganooxytitanium and/or partial hydrolytic condensate thereof and (B2) an acetoacetate in a ratio of from 0.8 mole to less than 1.2 moles of acetoacetate (B2) per mole of titanium atoms in (B1).

[3]

The primer composition of [1] wherein component (B) is a mixture of reaction products which are formed by mixing (B1) a tetraorganooxytitanium and/or partial hydrolytic condensate thereof and (B3) an organooxy-containing titanium chelate compound having two acetoacetate chelates per titanium atom, in a ratio of from 0.8 mole to less than 1.2 moles of the organooxy-containing titanium chelate compound having two acetoacetate chelates per titanium atom (B3) per mole of titanium atoms in (B1).

[4]

The primer composition of any one of [1] to [3] which is free of an amino-containing silane coupling agent, epoxy-containing silane coupling agent, and isocyanurate ring-containing silane.

[5]

The primer composition of any one of [1] to [4] which has a working life of at least 20 minutes after it is transferred from a closed container to an open container in an environment of temperature 23° C. and relative humidity 50%.

[6]

In connection with a curtain wall unit for securing glass, comprising a frame of metal and/or resin-painted metal and a silicone rubber layer disposed on the surface of the frame and composed of a cured product of a two-part dealcoholization type room temperature-curable organopolysiloxane composition, the primer composition of any one of [1] to [5] which is used as a primer to the metal and/or painted metal surface.

[7]

A curtain wall unit wherein a cured product layer of a room temperature-curable organopolysiloxane composition is bonded to a metal and/or painted metal surface through a coating layer of the primer composition of [6].

Advantageous Effects of Invention

According to the invention, there are provided a primer composition which develops good adhesion to a variety of adherends such as acrylic electrophoretic painted aluminum and fluororesin-painted aluminum, and has improved bond durability and a long working life on use; and a curtain wall unit using the primer composition.

DESCRIPTION OF EMBODIMENTS

Below the invention is described in more detail. The invention is not limited to the following embodiments and any suitable combination of constituent elements is encompassed in the invention.

The invention provides a primer composition which is effective for improving the adhesion between a substrate selected from organic resins, metals and resin-painted metals and a cured product of a RT-curable organopolysiloxane composition, the primer composition comprising:

(A) 100 parts by weight of an organosiloxane polymer of three-dimensional network structure comprising $R_3SiO_{1/2}$ units and $SiO_{4/2}$ units, a molar ratio of $R_3SiO_{1/2}$ units to $SiO_{4/2}$ units being 0.6 to 1.2, wherein R is each independently a $C_1$-$C_6$ substituted or unsubstituted monovalent hydrocarbon group, (B) 300 to 1,000 parts by weight of a titanium compound having the formula (1) or a mixture of organooxy-containing titanium compounds containing at least 75 mol % of a titanium compound having the formula (1):

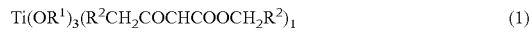

$$Ti(OR^1)_3(R^2CH_2COCHCOOCH_2R^2)_1 \quad (1)$$

wherein $R^1$ which may be the same or different is a substituted or unsubstituted monovalent hydrocarbon group, and $R^2$ which may be the same or different is hydrogen and/or a substituted or unsubstituted monovalent hydrocarbon group, and (C) 1,000 to 8,000 parts by weight of a solvent.

The components in the primer composition are described below in detail.

<(A) Organosiloxane Polymer>

Component (A) is an organosiloxane polymer which becomes a main component after drying of the inventive primer composition (i.e., after the solvent as component (C) is dried off), which determines the film formability of the primer composition coated onto a substrate.

Component (A) is an organosiloxane polymer of three-dimensional network structure comprising $R_3SiO_{1/2}$ units and $SiO_{4/2}$ units, a molar ratio of $R_3SiO_{1/2}$ units to $SiO_{4/2}$ units being from 0.6 to 1.2, wherein R is each independently a substituted or unsubstituted monovalent hydrocarbon group of 1 to 6 carbon atoms. It is a resinous organosiloxane copolymer or so-called silicone resin.

Herein R is each independently selected from monovalent hydrocarbon groups of 1 to 6 carbon atoms, for example, alkyl groups such as methyl, ethyl, propyl, isopropyl and hexyl, cycloalkyl groups such as cyclohexyl, alkenyl groups such as vinyl, allyl and propenyl, and aryl groups such as phenyl, and substituted monovalent hydrocarbon groups in which one, or more or even all hydrogen atoms are substituted by halogen atoms or the like, such as chloromethyl and 3,3,3-trifluoropropyl. The copolymer is a material well known in the art, obtained from co-hydrolysis and condensation of a hydrolyzable triorganosilane and a R-free hydrolyzable silane or siloxane.

The molar ratio of $R_3SiO_{1/2}$ units to $SiO_{4/2}$ units ranges from 0.6 to 1.2, preferably from 0.7 to 1.0. If the molar ratio is less than 0.6, a primer film after drying of the primer composition becomes too hard. If the molar ratio exceeds 1.2, a primer film becomes brittle, indicating poor adhesion and adhesion durability.

It is noted that the organosiloxane polymer may further contain $RSiO_{3/2}$ units and $R_2SiO_{2/2}$ units in a total amount of 0 to 10 mol %, especially 0 to 5 mol % based on the sum of $R_3SiO_{1/2}$ units and $SiO_{4/2}$ units insofar as the benefits thereof are not impaired.

Also, the organosiloxane polymer has a hydroxysilyl (or silanol) content of 0.04 to 0.07 mol/100 g. A hydroxysilyl content of less than 0.04 mol/100 g may lead to poor adhesion whereas a hydroxysilyl content in excess of 0.07 mol/100 g may lead to poor durability.

The organosiloxane polymer is present in an amount of 0.5 to 10% by weight, especially 1 to 5% by weight based on the total weight of the primer composition.

<(B) Mixture of Alkoxy-Containing Titanium Compounds>

Component (B) is not only effective for improving the adhesion of the inventive primer composition to substrates, but also plays the role of an adhesion promoter for reducing the time within which adhesion develops between a cured product (silicone rubber layer) of a RT-curable organopolysiloxane composition and the primer composition.

Component (B) is a mixture of organooxy-containing titanium compounds containing at least 75 mol %, preferably at least 80 mol % of an organooxy-containing titanium compound such as an alkoxy-containing titanium compound having the following formula (1) as a main constituent.

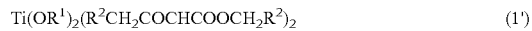

Herein $R^1$ which may be the same or different is a substituted or unsubstituted monovalent hydrocarbon group, and $R^2$ which may be the same or different is hydrogen and/or a substituted or unsubstituted monovalent hydrocarbon group.

Specifically, component (B) may be a mixture of reaction products which are formed by mixing (B1) a tetraorganooxytitanium such as tetraalkoxytitanium and/or partial hydrolytic condensate thereof and (B2) an acetoacetate (or acetoacetic ester) in a ratio of from 0.8 mole to less than 1.2 moles of the acetoacetate (B2) per mole of titanium atoms in (B1).

In this embodiment, the reaction of the tetraorganooxytitanium as component (B1) with the acetoacetate as component (B2) readily runs at RT (25° C.) in a quantitative manner to exchange one of four organooxy groups in the tetraorganooxytitanium as component (B1) with the acetoacetate to form a chelate complex having formula (1). If an excess of the acetoacetate as component (B2) is left in the reaction system even after all of component (B1) is converted to the titanium chelate complex having formula (1), then with respect to only an equimolar fraction of the titanium chelate complex having formula (1) corresponding to the excess of component (B2), one of three organooxy groups in the titanium chelate complex having formula (1) is further exchanged with the acetoacetate, to quantitatively form an alkoxy-containing titanium chelate complex having two organooxy groups per titanium atom and two acetoacetate chelates formed, which is component (B3) having the formula (1').

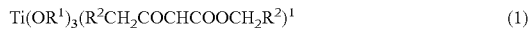

Herein $R^1$ and $R^2$ are as defined above.

Accordingly, when the mixing molar ratio of titanium atom in component (B1) and acetoacetate as component (B2) is 1:1 (equimolar), component (B) which is the reaction product is an organooxy-containing titanium chelate compound having three organooxy groups and one acetoacetate ligand in the molecule as represented by formula (1), i.e., consisting essentially (about 100 mol %) of a single component. When the mixing molar ratio of component (B2) to mole of titanium atoms in component (B1) is 0.8, the reaction product is a mixture in which the titanium chelate compound having formula (1) and the reactant or tetraorganooxytitanium as component (B1) are mixed in a molar ratio of about 4:1 (about 0.8:0.2). When the mixing molar ratio is 1.2, the reaction product is a mixture in which the titanium chelate compound having formula (1) and the alkoxy-containing titanium chelate complex having two acetoacetate chelates formed per titanium atom as component (B3) are mixed in a molar ratio of about 4:1 (about 0.8:0.2). Accordingly, the reaction product formed by mixing component (B1) with component (B2) in a molar ratio in the above range contains, in any case, the titanium chelate compound having formula (1) in a proportion of at least about 80 mol % (if not, at least 75 mol %).

Component (B) may also be a mixture of reaction products which are formed by mixing (B1) a tetraalkoxytitanium and/or partial hydrolytic condensate thereof and (B3) an alkoxy-containing titanium chelate compound having two acetoacetate chelates per titanium atom, in a ratio of from 0.8 mole to less than 1.2 moles of the alkoxy-containing titanium chelate compound having two acetoacetate chelates per titanium atom (B3) per mole of titanium atoms in (B1).

In this embodiment, the reaction of the tetraorganooxytitanium as component (B1) with the alkoxy-containing titanium chelate compound having two acetoacetate chelates per titanium atom as component (B3) readily runs at RT (25° C.) in a quantitative manner to exchange one of four organooxy groups in the tetraorganooxytitanium as component (B1) with one of the two acetoacetate chelates in component (B3). If the mixing molar ratio of titanium atoms in component (B1) to the alkoxy-containing titanium chelate compound having two acetoacetate chelates per titanium atom as component (B3) is 1:1 (equimolar), then exchange reaction between components (B1) and (B3) takes place just stoichiometrically, and as a result, component (B) or reaction product is an equimolar mixture of the titanium chelate compound having formula (1) derived from component (B1) and the titanium chelate compound having formula (1) derived from component (B3) in an approximate molar ratio of 1:1 (as the overall mixture, substantially 100 mol % of the titanium chelate compound having formula (1)). If the mixing molar ratio of component (B3) per mole of titanium atoms in component (B1) is 0.8, then the reaction product is a mixture of the reactant or tetraorganooxytitanium as component (B1), the titanium chelate compound having formula (1) derived from component (B1), and the titanium chelate compound having formula (1) derived from component (B3) in an approximate molar ratio of about 1:4:4 (about 0.2:0.8:0.8) (i.e., a mixture containing about 89 mol % of the titanium chelate compound having formula (1)). If the mixing molar ratio is 1.2, then the reaction product is a mixture of the reactant as component (B3), the titanium chelate compound having formula (1) derived from component (B1), and the titanium chelate compound having formula (1) derived from component (B3) in an approximate molar ratio of about 1:5:5 (about 0.2:1.0:1.0) (i.e., a mixture containing about 91 mol % of the titanium chelate compound having formula (1)). Therefore, the reaction product formed by mixing components (B1) and (B3) in a mixing molar ratio within the range contains, in any case, at least about 89 mol % (if not, at least 75 mol %) of the titanium chelate compound having formula (1) in admixture.

The tetraorganooxytitanium such as tetraalkoxytitanium as component (B1) (sometimes simply referred to as tetraalkoxytitanium, hereinafter) and partial hydrolytic condensate thereof is a tetraorganooxytitanium having the general formula (2):

$$\text{Ti}(\text{OR}^1)_4 \qquad (2)$$

wherein $R^1$ which may be the same or different is a substituted or unsubstituted monovalent hydrocarbon group, and partial hydrolytic condensate thereof. In formula (2), the monovalent hydrocarbon group $R^1$ is preferably a lower alkyl group of up to 8 carbon atoms. Examples of the tetraalkoxytitanium which are preferred herein include tetraethoxytitanium, tetrapropoxytitanium, tetraisopropoxytitanium, tetrabutoxytitanium, tetra(tert-butoxy)titanium, and tetra(2-ethylhexoxy)titanium. These alkoxytitanium compounds may be used alone or in admixture or in the form of co-hydrolysate. It is known that when two alkoxytitanium compounds having different alkoxy groups are mixed, some of alkoxy groups in both the compounds undergo exchange reaction, indicating an increased freedom of design of alkoxy group on alkoxytitanium. It is also known that when the alkoxytitanium is mixed with an alcohol or alkoxysilane, some or all of alkoxy groups undergo exchange reaction. Therefore, when the primer composition contains an alcohol or alkoxysilane, the type thereof must be selected and the amount thereof must be adjusted such that no performance demerits arise even when the alcohol is exchanged to an alkoxy group.

The acetoacetate (or acetoacetic ester) as component (B2) has the general formula (3):

$$R^2CH_2C(=O)CH_2C(=O)OCH_2R^2 \qquad (3)$$

wherein $R^2$ which may be the same or different is hydrogen and/or a substituted or unsubstituted monovalent hydrocarbon group.

In formula (3), $R^2$ is preferably hydrogen and/or a lower alkyl group of up to 8 carbon atoms. Preferred are methyl acetoacetate wherein both $R^2$ are hydrogen, and ethyl acetoacetate wherein $R^2$ on the ester side (right side) is methyl and $R^2$ on the other side (left side) is hydrogen.

Of the acetoacetates used herein, ethyl acetoacetate, methyl acetoacetate, isopropyl acetoacetate, and t-butyl acetoacetate are especially preferred. These acetoacetates may be used alone or in admixture.

Preferably the organooxy-containing titanium chelate compound having two acetoacetate chelates per titanium atom as component (B3) corresponds to the compound having the above general formula (1) wherein one of three organooxy groups ($OR^1$) in the molecule is replaced by an acetoacetate ligand ($R^2CH_2COCHCOOCH_2R^2$) (i.e., titanium chelate compound having two organooxy groups (OR) and two acetoacetate ligands ($R^2CH_2COCHCOOCH_2R^2$) in the molecule). Exemplary of component (B3) are diorganooxytitanium bisacetoacetate complexes including dialkoxytitanium bis(ethyl acetoacetate) complexes such as diisopropoxytitanium bis(ethyl acetoacetate), di-n-butoxytitanium bis(ethyl acetoacetate), di-tert-butoxytitanium bis(ethyl acetoacetate), and di(2-ethylhexoxy)titanium bis(ethyl acetoacetate).

In the invention, component (B) is present in a range of 1 to 20% by weight, preferably 3 to 10% by weight based on the total weight of the primer composition.

The amount of component (B) is 300 to 1,000 parts by weight per 100 parts by weight of component (A). The amount of component (B) is preferably 350 to 800 parts by weight, more preferably 400 to 700 parts by weight. If the amount is less than 300 parts by weight, the development of adhesion is delayed, failing to achieve the desired adhesion in a short time. If the amount exceeds 1,000 parts by weight, the primer composition has a lower shelf stability so that the primer composition after the lapse of a long time after its preparation ceases to adhere to various substrates, increasing the opportunity of a cured product of a curable composition applied thereon peeling from the substrate together with the primer composition.

<(C) Solvent>

Component (C) is a solvent which is used to dissolve or disperse components (A) and (B) to facilitate coating operation and impart quick drying property. Although the type of solvent as component (C) is not particularly limited as long as the primer composition does not lose transparency and uniformity, it is selected depending on the solvent resistance of an adherend to be coated and brush coating conditions.

Among such solvents, good solvents for component (A) include ketones such as acetone and methyl ethyl ketone, esters such as ethyl acetate and butyl acetate, aliphatic hydrocarbons such as n-hexane, n-heptane, and isooctane (2,2,4-trimethylpentane), and aromatic hydrocarbons such as toluene and xylene. Also, alcohols may be used as the poor solvent for component (A). Suitable alcohols include, for example, methanol, ethanol, isopropyl alcohol and 2-ethyl-1-hexanol.

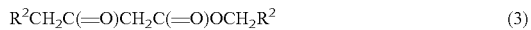

The amount of component (C) blended is 1,000 to 8,000 parts by weight, preferably 2,000 to 7,000 parts by weight per 100 parts by weight of component (A). If the amount of component (C) is less than 1,000 parts by weight, a layer of the primer composition left on the substrate surface after coating and drying becomes too thick and is likely to peel from the substrate, and the relatively increased amount of components (A) and (B) is disadvantageous in cost. If the amount of component (C) exceeds 8,000 parts by weight, a layer of the primer composition left after drying becomes too thin to exert the adhesion-improving function, and the primer composition has a short working life in a humid environment despite a lowering of viscosity.

<(D) Additive>

As optional component (D) or additive, the primer composition of the invention may contain a hydrolyzable group-containing silane such as alkyltrialkoxysilane, if necessary, for the purpose of improving shelf stability or the like. Examples of the alkyltrialkoxysilane as component (D) include methyltrimethoxysilane, methyltriethoxysilane, ethyltrimethoxysilane, n-propyltrimethoxysilane, and vinyltrimethoxysilane, with methyltrimethoxysilane being preferred.

The amount of component (D) blended is 0.1 to 100 parts by weight per 100 parts by weight of component (A). The amount of component (D) is preferably 0.5 to 10 parts by weight, more preferably 1 to 5 parts by weight. If the amount is less than 0.1 part by weight, the primer composition builds up its viscosity during storage and has a shorter time until gelation. An amount of more than 100 parts by weight raises an economic disadvantage, despite substantially no demerits in performance.

<Other Additives>

Other optional components may be added to the primer composition of the invention insofar as its performance is not compromised. Other components include silanol condensation catalysts, typically organotin compounds such as dibutyltin dimethoxide, dibutyltin diacetate, dibutyltin dioctanoate, and dibutyltin dilaurate; aluminum alkoxides such as aluminum acetylacetonate; zirconium alkoxides such as zirconium acetylacetonate; and tackifiers such as silane coupling agents. The type and amount of these components may be selected for a particular application.

It is noted that the primer composition does not contain an amino group-containing silane coupling agent, epoxy group-containing silane coupling agent, and isocyanurate ring-containing silane.

<Bonding Method Using Primer Composition>

Using the primer composition of the invention, a RT-curable organopolysiloxane composition, typically RT-curable silicone rubber composition of condensation reaction cure type is bonded and cured to various substrates. To this end, the primer composition is brush coated to the surface of various substrates such as metals, resin-painted metals (e.g., organic resin-painted metal surface such as aluminum painted with an acrylic resin or fluoro-resin based paint) or organic resins and dried, after which the curable composition is contacted with and cured to the coated surface.

The primer composition has a working life (or pot life) of at least 20 minutes after it is transferred from a closed container to an open pot in an environment of temperature 23(±10)° C. and relative humidity 50(±25)%.

The drying time for the primer composition after coating is preferably in a range of 5 to 480 minutes, more preferably 10 to 120 minutes at normal temperature (~25° C.). If the drying time is shorter than 5 minutes, the solvent is insufficiently dried, and a primer layer after drying does not have a strength. If the drying time exceeds 480 minutes, there is a strong possibility that contaminants such as airborne dust or debris deposit on the surface, which interfere with adhesion. The primer layer typically has a thickness of about 0.1 to 500 µm, preferably about 1 to 100 µm, more preferably about 5 to 50 µm.

On the coated surface having the primer layer formed thereon, a RT-curable organopolysiloxane composition is deposited. The RT-curable organopolysiloxane composition is typically divided into two portions, base and curing agent. On use, they are mixed together whereupon the mixture starts curing into a rubbery product. The composition has advantages that the shelf stability is good because it is stored in previously divided two portions, and the cure speed may be adjusted as appropriate by selecting the amount of curing agent. The curing mechanism is that cure takes place through dealcoholization between silanol groups and hydrolyzable groups while utilizing catalysts such as acids, alkalis, organotin compounds and organotitanium compounds.

As the RT-curable organopolysiloxane composition, for example, SEALANT-FC-295SG (Shin-Etsu Silicone Korea Co., Ltd.) may be used. This composition may be cured at normal temperature (~25° C.) for about 0.5 hour to 28 days, preferably about 3 hours to 21 days, more preferably about 6 hours to 14 days. A cured product (silicone rubber layer) of the RT-curable organopolysiloxane composition typically has a thickness of about 100 to 1,000,000 µm, preferably about 1,000 to 100,000 µm.

The primer composition defined above is applicable as seals of window frames, exterior water-proof seals for tower buildings, and interior seals in wet areas (e.g., kitchen, lavatory and bathroom). Particularly in connection with a curtain wall unit for securing glass, comprising a frame of metal and/or resin-painted metal and a silicone rubber layer disposed on the surface of the frame and composed of a cured product of a two-part dealcoholization type RT-curable organopolysiloxane composition, the inventive primer composition is useful as a primer coated to the metal and/or painted metal surface. Further, a curtain wall unit wherein a cured product layer of a RT-curable organopolysiloxane composition is bonded to a metal and/or painted metal surface through a coating layer of the inventive primer composition is useful.

Notably, the inventive primer composition is effective as a tackifier, adhesion promoter and adhesion development improver in bonding a cured product (silicone rubber) of a RT-curable organopolysiloxane composition to various substrates. Besides the RT-curable organopolysiloxane composition, the primer composition is also effective to curable compositions having a silyl group capable of forming a siloxane bond with the primer composition, for example, modified silicone base curable compositions and silylated polyurethane base compositions.

EXAMPLES

Examples of the invention are given below by way of illustration and not by way of limitation. Notably, Me stands for methyl.

Examples and Comparative Examples

Compositions of Examples 1 to 6 and Comparative Examples 1 to 6 were prepared by the following procedure using the components shown in Table 1.

Example 1

A pale yellow transparent primer composition was prepared by combining 143 parts by weight of a 70 wt % toluene solution of an organosiloxane polymer of three-dimensional network structure consisting of $Me_3SiO_{1/2}$ units and $SiO_{4/2}$ units in a molar ratio of $Me_3SiO_{1/2}$ units/$SiO_{4/2}$ units of 0.85, with 4,750 parts by weight of n-hexane, 50 parts by weight of isopropyl alcohol, 400 parts by weight (1.18 mol) of tetra-n-butoxytitanium, and 150 parts by weight (1.15 mol) of ethyl acetoacetate, and mixing at RT (25° C.) until uniform.

Example 2

A pale yellow transparent primer composition was prepared as in Example 1 aside from changing the amount of ethyl acetoacetate from 150 parts by weight to 130 parts by weight (1.00 mol).

Example 3

A pale yellow transparent primer composition was prepared as in Example 1 aside from changing the amount of ethyl acetoacetate from 150 parts by weight to 145 parts by weight (1.12 mol) and the amount of tetra-n-butoxytitanium from 400 parts by weight to 330 parts by weight (0.97 mol).

Example 4

A pale yellow transparent primer composition was prepared as in Example 1 aside from using 280 parts by weight (0.56 mol) of a 95 wt % isopropyl alcohol solution of diisopropoxytitanium bis(ethyl acetoacetate) instead of 150 parts by weight of ethyl acetoacetate and changing the amount of tetra-n-butoxytitanium from 400 parts by weight to 270 parts by weight (0.79 mol).

Example 5

A pale yellow transparent primer composition was prepared as in Example 1 aside from using 315 parts by weight (0.66 mol) of a 95 wt % isopropyl alcohol solution of diisopropoxytitanium bis(ethyl acetoacetate) instead of 150 parts by weight of ethyl acetoacetate and changing the amount of tetra-n-butoxytitanium from 400 parts by weight to 240 parts by weight (0.71 mol).

Example 6

A pale yellow transparent primer composition was prepared as in Example 1 aside from using 340 parts by weight (0.71 mol) of a 95 wt % isopropyl alcohol solution of diisopropoxytitanium bis(ethyl acetoacetate) instead of 150 parts by weight of ethyl acetoacetate and changing the amount of tetra-n-butoxytitanium from 400 parts by weight to 215 parts by weight (0.63 mol).

Comparative Example 1

A pale yellow transparent primer composition was prepared as in Example 1 aside from omitting ethyl acetoacetate.

Comparative Example 2

A pale yellow transparent primer composition was prepared as in Example 1 aside from changing the amount of ethyl acetoacetate from 150 parts by weight to 100 parts by weight (0.77 mol).

Comparative Example 3

A pale yellow transparent primer composition was prepared as in Example 1 aside from changing the amount of ethyl acetoacetate from 150 parts by weight to 300 parts by weight (2.31 mol).

Comparative Example 4

A pale yellow transparent primer composition was prepared as in Example 1 aside from changing the amount of n-hexane from 4,750 parts by weight to 15,000 parts by weight.

Comparative Example 5

A pale yellow transparent primer composition was prepared as in Example 1 aside from using 190 parts by weight (0.40 mol) of a 95 wt % isopropyl alcohol solution of diisopropoxytitanium bis(ethyl acetoacetate) instead of 150 parts by weight of ethyl acetoacetate and changing the amount of tetra-n-butoxytitanium from 400 parts by weight to 360 parts by weight (1.06 mol).

Comparative Example 6

A pale yellow transparent primer composition was prepared as in Example 1 aside from using 380 parts by weight (0.80 mol) of a 95 wt % isopropyl alcohol solution of diisopropoxytitanium bis(ethyl acetoacetate) instead of 150 parts by weight of ethyl acetoacetate and changing the amount of tetra-n-butoxytitanium from 400 parts by weight to 180 parts by weight (0.53 mol).

TABLE 1

| Formulation (pbw) | Example | | | | | | Comparative Example | | | | | |
|---|---|---|---|---|---|---|---|---|---|---|---|---|
| | 1 | 2 | 3 | 4 | 5 | 6 | 1 | 2 | 3 | 4 | 5 | 6 |
| 70% toluene solution of organosiloxane polymer (organosiloxane polymer) | 143 (100) | 143 (100) | 143 (100) | 143 (100) | 143 (100) | 143 (100) | 143 (100) | 143 (100) | 143 (100) | 143 (100) | 143 (100) | 143 (100) |
| tetra-n-butoxytitanium | 400 | 400 | 330 | 270 | 240 | 215 | 400 | 400 | 400 | 400 | 360 | 180 |
| 95 wt % isopropyl alcohol solution of diisopropoxytitanium bis(ethyl acetoacetate) | 0 | 0 | 0 | 280 | 315 | 340 | 0 | 0 | 0 | 0 | 190 | 380 |
| Ethyl acetoacetate | 150 | 130 | 145 | 0 | 0 | 0 | 0 | 100 | 300 | 150 | 0 | 0 |
| n-hexane | 4,750 | 4,750 | 4,750 | 4,750 | 4,750 | 4,750 | 4,750 | 4,750 | 4,750 | 15,000 | 4,750 | 4,750 |
| Isopropyl alcohol | 50 | 50 | 50 | 50 | 50 | 50 | 50 | 50 | 50 | 50 | 50 | 50 |

<Evaluation of Adhesion>

Each of the primer compositions of Examples 1 to 6 and Comparative Examples 1 to 6 was evaluated for adhesion to a painted aluminum plate by the following method.

[Preparation of Specimen]

Each primer composition was coated with a brush to an acrylic electrophoretic painted aluminum plate and allowed to stand under conditions: 23° C. and relative humidity (RH) 50% for 30 minutes. A mixture of base and curing agent of two-part silicone base sealant of dealcoholization type (SEALANT-FC-295SG, Shin-Etsu Silicone Korea Co., Ltd.) was coated to the surface of aluminum plate coated with the primer composition and shaped with a spatula to a shape of 10 mm wide, 50 mm long, and 2 mm thick, obtaining a specimen.

[Adhesion Test]

The specimen was cured under the following conditions. Thereafter, the interfacial bond between the adherend and the primer composition was evaluated by a knife cutting/manual peeling test, namely by cutting the cured product of the silicone base sealant with a knife, manually peeling the cut strip (grasping and pulling the strip with the hand), and observing the peeling behavior.

[Initial Adhesion]

After the specimen was cured in an environment of temperature 23° C. and relative humidity 50% for 7 days, it was evaluated for initial adhesion by the knife cutting/manual peeling test. The specimen is rated excellent (⊚) when the cohesive failure area of the sealant is 100%, good (○) when the area is from 80% to less than 100%, mediocre (Δ) when the area is from 50% to less than 80%, and poor (X) when the area is less than 50%. For each primer composition, the test results of initial adhesion are shown in Table 2.

[Water Immersion Adhesion]

After the specimen was cured in an environment of temperature 23° C. and relative humidity 50% for 7 days and immersed in warm water at 50° C. for 7 days, it was evaluated for water resistant adhesion by the same test as the test of initial adhesion. For each primer composition, the test results of water resistant adhesion are shown in Table 2.

<Evaluation of Working Life>

Each of the primer compositions of Examples 1 to 6 and Comparative Examples 1 to 6 was evaluated for a working life by the following method.

[Working Life]

Each primer composition, 3 g, was placed in an aluminum dish and held stationary in a thermo-hygrostat chamber at 23° C. and RH 50% for 30 minutes, after which any change of appearance was inspected. The sample was rated good (○) when it maintained a transparent liquid state, and poor (X) when it clouded, gelled or dried into solid. For each primer composition, the test results of working life are shown in Table 2.

Additionally, the adhesion test was carried out using the primer composition after 30 minutes of stationary holding, with the results shown in Table 2.

TABLE 2

|  | Example | | | | | | Comparative Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Initial adhesion | ○ | ○ | ○ | ○ | ○ | ○ | ○ | ○ | Δ | ○ | ○ | Δ |
| Water immersion adhesion | ○ | ○ | ○ | ○ | ○ | ○ | ○ | ○ | Δ | ○ | ○ | Δ |
| Working life (state after 30 min. holding) | ○ | ○ | ○ | ○ | ○ | ○ | X | ○ | ○ | X | X | ○ |
| Initial adhesion after 30 min. holding | ○ | ○ | ○ | ○ | ○ | ○ | not tested | Δ | Δ | not tested | not tested | Δ |
| Water immersion adhesion after 30 min. holding | ○ | ○ | ○ | ○ | ○ | ○ | not tested | Δ | Δ | not tested | not tested | Δ |

INDUSTRIAL APPLICABILITY

The primer composition of the invention is of great worth in the industry because it is advantageously used in bonding RT-curable organopolysiloxane compositions used as building sealants, general industrial sealants and adhesives to a variety of adherends, and has improved adhesion to difficultly bondable adherends such as acrylic electrodeposits, improved adhesion durability at high temperature, and a sufficient working life for coating operation.

The invention claimed is:

1. A frame for use in a curtain wall,
the frame having a surface, wherein the frame and the surface thereof are of metal and/or resin-painted metal, the frame has a primer layer disposed on the surface thereof and a silicone rubber layer disposed on the primer layer,
wherein the primer layer is formed from a primer composition, and the silicone rubber layer comprises a cured product of a two-part dealcoholization room temperature-curable organopolysiloxane composition,
wherein the primer composition comprises:
(A) 100 parts by weight of an organosiloxane polymer of three-dimensional network structure comprising $R_3SiO_{1/2}$ units and $SiO_{4/2}$ units, a molar ratio of $R_3SiO_{1/2}$ units to $SiO_{4/2}$ units being 0.7 to 1.0, wherein each R is independently a substituted or unsubstituted monovalent hydrocarbon group of 1 to 6 carbon atoms,
(B) 400 to 700 parts by weight of a titanium compound having the formula (1) or a mixture of organooxy-containing titanium compounds containing at least 80 mol % of a titanium compound having the formula (1):

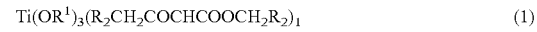

$$Ti(OR^1)_3(R_2CH_2COCHCOOCH_2R_2)_1 \quad (1)$$

wherein each $R^1$ is n-butyl, and each $R^2$ which may be the same or different is hydrogen or methyl, and
(C) 2,000 to 7,000 parts by weight of at least one solvent selected from the group consisting of n-hexane, n-heptane, isooctane (2,2,4-trimethylpentane), toluene, xylene, methanol, ethanol, isopropyl alcohol, and 2-ethyl-1-hexanol, wherein the primer composition has a working life of at least 20 minutes after it is transferred from a closed container to an open container in an environment of temperature 23° C. and relative humidity 50%, and wherein the primer layer is a dried layer formed from the primer composition.

2. The frame of claim 1 wherein component (B) of the primer composition is a mixture of reaction products which are formed by mixing (B1) tetra-n-butoxytitanium and/or partial hydrolytic condensate thereof and (B2) an acetoacetate in a ratio of from 0.8 mole to less than 1.2 moles of acetoacetate (B2) per mole of titanium atoms in (B1).

3. The frame of claim 1, wherein the primer composition is free of an amino-containing silane coupling agent, free of an epoxy-containing silane coupling agent, and free of an isocyanurate ring-containing silane.

4. The frame of claim 1 wherein the frame is a fluororesin painted, or acrylic electrophoretic painted adherend.

5. The frame of claim 1, wherein the organosiloxane polymer has a hydroxysilyl content of 0.04 to 0.07 mol/100 g.

6. The frame of claim 1, wherein component (B) is an adhesion promoter for reducing the time within which adhesion develops between the silicone rubber layer and the primer layer.

7. A frame for use in a curtain wall, the frame having a surface, wherein the frame and the surface thereof are of metal and/or resin-painted metal, the frame has a primer layer disposed on the surface thereof and a silicone rubber layer disposed on the primer layer, wherein the primer layer is formed from a primer composition, and the silicone rubber layer comprises a cured product of a two-part dealcoholization type room temperature-curable organopolysiloxane composition, wherein the primer composition consists of:
(A) 100 parts by weight of an organosiloxane polymer of three-dimensional network structure comprising $R_3SiO_{1/2}$ units and $SiO_{4/2}$ units, a molar ratio of $R_3SiO_{1/2}$ units to $SiO_{4/2}$ units being 0.7 to 1.0, wherein each R is independently a substituted or unsubstituted monovalent hydrocarbon group of 1 to 6 carbon atoms,
(B) 300 to 1,000 parts by weight of a titanium compound having the formula (1) or a mixture of organooxy-containing titanium compounds containing at least 80 mol % of a titanium compound having the formula (1):

$$Ti(OR^1)_3(R^2CH_2COCHCOOCH_2R_2)_1 \qquad (1)$$

wherein each $R^1$ which may be the same or different is ethyl, propyl, isopropyl, butyl, or tert-butyl, and each $R^2$ which may be the same or different is hydrogen or methyl, and
(C) 1,000 to 8,000 parts by weight of at least one solvent selected from the group consisting of ketones, aliphatic hydrocarbons, aromatic hydrocarbons, and alcohols, wherein the primer composition has a working life of at least 20 minutes after it is transferred from a closed container to an open container in an environment of temperature 23° C. and relative humidity 50%, and wherein the primer layer is a dried layer formed from the primer composition.

8. A method for producing the frame of claim 1 comprising the steps of:

transferring the primer composition from a closed container therein to an open pot;

coating the primer composition in the open pot to the surface of the frame;

drying the primer composition thereon to form the primer layer;

coating a mixture of the two-part dealcoholization room temperature-curable organopolysiloxane composition on the primer layer; and curing the organopolysiloxane composition to form the silicone rubber layer.

* * * * *